United States Patent
Kray et al.

(10) Patent No.: US 8,354,492 B2
(45) Date of Patent: Jan. 15, 2013

(54) PREPARATION OF CAST POLYAMIDES USING SPECIAL ACTIVATORS

(75) Inventors: Bernd Kray, Speyer (DE); Andreas Kugler, Mannheim (DE); Willhelm Laufer, Ellerstadt (DE); Peter Schuster, Altrip (DE); Volker Wenzel, Heddesheim (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 485 days.

(21) Appl. No.: 12/372,125

(22) Filed: Feb. 17, 2009

(65) Prior Publication Data

US 2009/0306332 A1   Dec. 10, 2009

(30) Foreign Application Priority Data

Feb. 20, 2008   (DE) .................. 10 2008 000 352

(51) Int. Cl.
*C08G 69/16* (2006.01)
(52) U.S. Cl. .................. 528/323; 502/167; 528/310
(58) Field of Classification Search .................. 528/310, 528/323; 502/167
See application file for complete search history.

(56) References Cited

U.S. PATENT DOCUMENTS

| | | | |
|---|---|---|---|
| 2,941,956 A | 6/1960 | Bergstrom | |
| 3,502,722 A | 3/1970 | Neumann | 260/566 |
| 3,567,696 A * | 3/1971 | Sahler et al. | 528/315 |
| 3,780,157 A * | 12/1973 | Hechlhammer et al. | 264/310 |
| 4,022,752 A | 5/1977 | Horn et al. | 260/45.75 B |
| 4,160,080 A | 7/1979 | Koenig et al. | |
| 4,754,000 A | 6/1988 | Meyer et al. | |
| 5,205,975 A * | 4/1993 | Furlan et al. | 264/240 |
| 5,637,664 A | 6/1997 | Bruchmann et al. | 528/73 |
| 5,756,647 A * | 5/1998 | Schmid et al. | 528/323 |
| 7,067,654 B2 | 6/2006 | Richter et al. | 540/202 |
| 7,098,289 B2 | 8/2006 | Laas et al. | 528/52 |
| 7,297,752 B2 | 11/2007 | Bernard | 528/44 |
| 2005/0143548 A1 | 6/2005 | Loontjens et al. | |
| 2006/0167124 A1* | 7/2006 | Bernard et al. | 521/163 |
| 2009/0306332 A1 | 12/2009 | Kray et al. | |

FOREIGN PATENT DOCUMENTS

| | | |
|---|---|---|
| DE | 1 130 594 | 5/1962 |
| DE | 35 21 230 | 12/1985 |
| DE | 43 28 882 | 3/1995 |
| DE | 4430663 A1 | 3/1996 |
| EP | 0 641 816 | 3/1995 |
| FR | 1.180.370 | 6/1959 |
| JP | 60 096620 | 5/1985 |
| JP | 06 271664 | 9/1994 |
| JP | 4733279 B2 | 7/2011 |

OTHER PUBLICATIONS

Thomson Scientific, London, GB; AN 1985-167875 XP002526156.
Thomson Scientific, London, GB; AN 1994-347196 XP002526157.
European Search Report dated May 11, 2009.
American Chemical Society; 2003, 44(1) pp. 46-47 Catalysis in polyisocyanate manufacture: Polymer Preprints.
Campbell et al., "Carbodiimides. IV. High Polymers Containing the Carbodiimide Repeat Unit", J. Org. Chem., (1963) 28(8):2069-2075.
Williams et al., "Carbodiimide Chemistry: Recent Advances", Chemical Reviews, (1981) 81(4):619-621.
Richter, et al., "Catalysis in Polyisocyanate Manufacture", Bayer Polymers (BPO), Leverkusen, DE, Polymer Reprints 44(1), p. 46-47 (2003).
Annual Report of 2003 of the Fraunhofer-Institut fur Angewandte Polymerforschung IAP, 2003, p. 54.
Bildung und Verhalten de Polyamide, [Litertur S. 56], p. 42-61.

* cited by examiner

*Primary Examiner* — Gregory Listvoyb
(74) *Attorney, Agent, or Firm* — Michael A. Miller

(57) ABSTRACT

The present invention relates to a system comprising
a) at least one catalyst for the anionic polymerization of lactams, and
b) at least one activator for the anionic polymerization of lactams, wherein the at least one activator is a cyclic isocyanate, at least one allophanate or a mixture thereof.

12 Claims, No Drawings

PREPARATION OF CAST POLYAMIDES USING SPECIAL ACTIVATORS

The present invention relates to a composition usable in the preparation of cast polyamides, and a process for preparing cast polyamides carried out using this composition. Other subject matters of the present invention are, on the one hand, the molded articles of polyamide obtainable by this process, and, on the other hand, the use of specific activators and specific compositions of catalyst and activator for preparing cast polyamides.

In principle, there are two methods for preparing polyamide molded articles. One method comprises an injection-molding of polyamide which has already been prepared into corresponding molds. The other method comprises preparing so-called cast polyamides. Cast polyamides are particularly high-molecular polyamides. Preparation is carried out in a purely chemical way and, generally, without the use of pressure. During the preparation of cast polyamides, a lactam is poured into a mold together with at least one catalyst and at least one activator, and then polymerized anionically in this mold. In the process, the parent compounds present in the mold generally polymerize under the influence of heat. The result is a homogeneous material that is superior to extruded polyamides with respect to crystallinity.

Cast polyamides, as thermoplastics, are suitable for the fabrication of complex components. In contrast to many thermoplastics, they need not be fused on, but result from a pressureless anionic polymerization of a lactam in a mold at 120 to 150° C. within just a few minutes. All known casting methods such as standing casting, rotational casting and centrifugal casting can be used in the process; in each case, the end product that is obtained are molded articles from a high-molecular, crystalline polyamide characterized by low weight, high mechanical durability, very good sliding properties and excellent chemical resistance, and which has only a small amount of internal stresses, because the molds are not filled under pressure. Cast polyamides can be sawed, drilled, milled, ground, welded and printed or painted; apart from complex hollow molds, rollers for passenger elevators and semi-finished products, such as, for example, tubes, rods and plates for the automobile industry are manufactured from this polymer.

The manufacture of cast polyamide parts starting with low-viscosity lactam melts and a catalyst and an activator by the so-called activated anionic polymerization is known per se (e.g. Vieweg, Müller; Kunststoff-Handbuch, vol. VI, Carl Hansa Verlag, München, 1966). For this purpose, two mixtures of catalyst and lactam or activator and lactam are usually prepared separate from each other and are mixed in the mold ar shortly before.

A corresponding method is described, for example, in the annual report of 2003 of the Fraunhofer Institute for Applied Polymer Research IAP (page 54) for producing cast polymers by anionic polymerization of □-caprolactam.

A method for producing filled or reinforced cast polyamide, wherein the melts intended for polymerization are brought into a thixotropic state and then caused to polymerize is known from EP 0 641 816 A1. An alkaline or earth-alkaline actamate serves as a catalyst, and an oligomer of hexamethylene diisocyanate is preferably used as a activator.

What is characteristic for the methods for producing cast polyamides known from the prior art is that the anionic polymerization to result in a polyamide occurs as soon as the lactam is brought into contact with the system consisting of the catalyst and the activator. Oftentimes, however, it is desired that the anionic polymerization starts at a later, i.e. delayed point in time, for example after the parent compounds of lactam and additives were given sufficient time to mix homogeneously in an appropriate mold. Hitherto, it is necessary to add either the activator or the catalyst to the lactam-containing educt mixture later in order for the anionic polymerization to set in at a later point in time. Nevertheless, this activator or catalyst, which is added at a later point in time, must be present in the corresponding lactam in a homogeneous distribution, if possible, at the start of the anionic polymerization. In turn, this is generally possible only if the catalyst and the activator are filled into the mold in a homogeneous form together with the lactam.

Thus, the object of the present invention consists of providing a system comprising a catalyst and, separately, an activator, which are each suitable for the anionic polymerization of lactams, wherein the anionic polymerization for forming the cast polyamide occurs not directly, i.e. not immediately after the lactam is brought into contact with the system consisting of the catalyst and the activator.

Furthermore, excellent crystallization properties of the cast polyamide are required, so that it is another object of the present invention to provide a system consisting of a catalyst and an activator for the anionic polymerization of lactams, which at the same time yields cast polyamides with a good crystallinity.

According to the invention, these objects are achieved with a system comprising a) at least one catalyst for the anionic polymerization of lactams, and b) at least one activator for the anionic polymerization of lactams.

The composition according to the invention is characterized in that the activator used is selected from the group consisting of cyclic isocyanates, allophanates and mixtures thereof.

A system within the meaning of the present invention is understood to be a unit of a) at least one catalyst for the anionic polymerization of lactams, and b) at least one activator for the anionic polymerization of lactams to be used according to the invention.

wherein the constituents a) and b), matched with each other, are used for anionic polymerization of lactams but need not be spatially adjacent (so-called kit of part). However, the constituents a) and b) may also be present spatially adjacent. In this context, this is also called a composition according to the invention.

The system or composition according to the invention comprises at least one activator for the anionic polymerization of lactams selected from the group consisting of cyclic isocyanates, allophanates and mixtures thereof. Mixtures within the meaning of the present invention are both mixtures of, exclusively, cyclic isocyanates or allophanates as well as of cyclic isocyanates with allophanates.

Cyclic Isocyanates

Within the context of the present invention, a cyclic isocyanate is a cyclic reaction product of at least two isocyanates forming at least two dioxodiazetidine bonds.

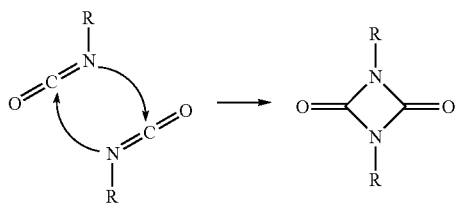

The preparation of corresponding cyclic isocyanates is known per se to the person skilled in the art and can take place in accordance with the procedure described in EP 1 422 223 A1 using phosphine-containing catalyst systems. Moreover, the cyclic isocyanates can be prepared in accordance with methods described in EP 1 521 789 A1 (using 1,2,3- or 1,2,4-triazolates as catalysts), in the article "Catalysis in polyisocyanate manufacture", Polymer Preprints (American Chemical Society) 2003, 44(1), 46-47 (using polyfluorides as catalysts), EP 1 352 006 A1 (using superacids as catalysts) and EP 0 572 995 A1 (using imidazol-containing polymers).

In the process, the cyclic isocyanates to be used according to the invention substantially, but preferably exclusively, act by the cyclic structure opening under the conditions of the polyamide production and by free isocyanates being formed, which then function as the actual activators. Therefore, special embodiments of masked isocyanates are provided within the context of the present invention.

The cyclic isocyanate has at least two linked isocyanate groups, which are present in the form of dioxidazetine bonds, in a molecule.

The temperature for breaking up the structure of the cyclic diisocyanate depends of the exact structure of the activator. However, temperatures in the general range of 100 to 160° C., preferably from 110 to 150° C., are required for breaking up the cyclic structure of the activator.

The cyclic isocyanate can be a dimer, trimer, oligomer or polymer, i.e., be constituted from a corresponding number of monomeric isocyanates. However, the use of dimeric isocyanates, i.e. of uretdions, is particularly preferred. These uretdions can also be present as oligomeric or polymeric uretdions, that is, the individual uretdion rings are connected to form an oligomer or polymer. A corresponding oligomer or polymer formation especially occurs when difunctional or polyfunctional isocyanates are used as monomeric isocyanates.

In principle, it is possible that the cyclic diisocyanate is based on a monomeric isocyanate having an aliphatic, cycloaliphatic or aromatic residue. The phrases "on the basis of" or "based on", within the context of the present invention, is understood to mean that the cyclic diisocyanate is obtained by cyclization starting with the basic (monomeric) isocyanate.

In the case where the cyclic diisocyanate is based on an aliphatic or cycloaliphatic isocyanate, the aliphatic or cycloaliphatic isocyanate preferably has 6 to 40 carbon atoms, particularly preferably 6 to 15 carbon atoms.

Suitable examples for cyclic isocyanates based on isocyanates having an aliphatic or cycloaliphatic residue are known per se to the person skilled in the art, and corresponding monomeric isocyanates comprise, for example, isophorone diisocyanate, 1,4-cyclohexyl diisocyanate, 1,1-methylene-bis-(4-isocyanatocyclohexane), 1,2-bis-(4-isocyanatononyl)-3-heptyl-4-pentylcyclohexane and hexamethylene-1,6-diisocyanate. Here, the use of isophorone diisocyanate and hexamethylene-1,6-diisocyanate is preferred.

Furthermore, it is possible within the context of the invention that a cyclic isocyanate is used as an activator, which is obtained based on an aromatic isocyanate. This aromatic isocyanate preferably has 6 to 20 carbon atoms, particularly preferably 6 to 15 carbon atoms. Appropriate aromatic monomeric isocyanates can, for example, be selected from the group consisting of 2,4-diisocyanatotoluene, 2,6-diisocyanatotoluene, 1,5-naphthylene diisocyanate, 4,4'-methylene diphenyldiisocyanate, 1,3-bis-(3-isocyanato-4-methylphenyl)-2,4-dioxodiazetidine, N,N'-bis-(4-methyl-3-isocyanatophenyl)-urea und tetramethylxylylene diisocyanate. Of these aromatic isocyanates, 2,4-diisocyanatotoluene, 2,6-diisocyanatotoluene and 4,4'-methylene-bis(phenyldiisocyanate) are preferred. 2,6-diisocyanatotoluene and 4,4'-methylene-bis(phenyldiisocyanate) are particularly preferred. 2,6-Diisocyanatotoluene is further particularly preferred.

Allophanates:

Apart from the cyclic diisocyanates, allophanates (carbamoyl carbamates) can also be used as masked activators for the preparation of cast polyamides within the context of the present invention. Allophanates to be used according to the invention have the general structure (I):

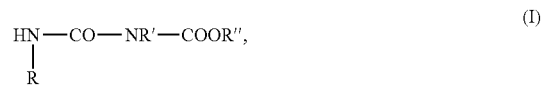

wherein

R and R' represent an isocyanate-containing alkyl residue with 1 to 20 carbon atoms or an isocyanate-containing aryl residue with 6 to 20 carbon atoms; and R" represents $C_1$-$C_{20}$-alkyl, preferably $C_1$-$C_{12}$-alkyl, in particular $C_1$-$C_6$-alkyl.

These allophanate group-containing compounds are generally obtainable by reacting arbitrary urethane-containing and/or urea group-containing parent compounds (containing units having the general formula (R"OOC—NHR')) with monoisocyanates having the general formula R—NCO, or with diisocyanates having the general formula OCN-A-NCO, wherein R or A preferably is an alkyl residue having 1 to 20 carbon atoms or an aryl residue having 6 to 20 carbon atoms.

Any aromatic, aliphatic and cycloaliphatic monoisocyanates having up to 20 carbon atoms, such as methyl isocyanate, isopropyl isocyanate, n-butyl isocyanate, n-hexyl isocyanate, cyclohexyl isocyanate, stearyl isocyanate, the optionally halogenated phenyl isocyanates, 1-naphtyl isocyanate, the optionally chlorinated or fluorinated m-, o-, and p-toloyl isocyanates, p-isopropylphenyl isocyanate, 2,6-diisopropylphenyl isocyanate and p-toluenesulfonyl diisocyanate are suitable as monoisocyanates.

Arbitrary aromatic, aliphatic and cycloaliphatic diisocyanates having 6 to 40 carbon atoms, preferably 6 to 15 carbon atoms, such as isophorone diisocyanate, 1,4-cyclohexyl diisocyanate, 1,1-methylene-bis-(isocyanatohexane), 1,2-bis-(4-isocyanatononyl)-3-heptyl-4-pentyl cyclohexane, hexamethylene-1,6-diisocyanate, 2,4-diisocyanatotoluene, 2,6-diisocyanatotoluene, 1,5-naphthylene diisocyanate, 4,4'-methylene diphenyldiisocyanate, 1,3-bis-(3-isocyanto-4-methylphenyl)-2,4-dioxodiazetidine, N,N'-bis-(4-methyl-3-isocyanatophenyl)-urea and tetramethylxylylene diisocyanate are suitable as diisocyanates. Of these, hexamethylene-1,6-diisocyanate is preferred.

An allophanate which is particularly preferred within the context of the invention are allophanates having the general formula (II)

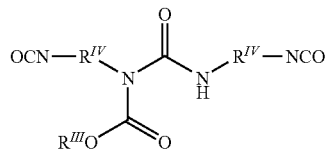

wherein $R^V$ represents $C_1$-$C_6$-alkyl and $R^{IV}$ represents $C_1$-$C_6$-alkyl, preferably —$(CH_2)_6$—.

Corresponding allophanates and their preparation are described, for example, in EP 0 000 194 A1, the disclosure of which pertaining to these allophanates is incorporated by reference into the present invention.

Relative to the urethane groups of the parent compound present, the isocyanate used for the formation of allophanates can be used in deficiency, in an equimolar quantity, as well as in excess. After the reaction is completed, the excess isocyanate must be separated in the latter case according to a method known to the person skilled in the art, such as, for example, destination or extraction. It is therefore preferred to use 0.1 to 1.0 mol isocyanate per 1.0 mol urethane and urea groups of the parent compound, the use of 0.5 to 1.0 mol isocyanate being particularly preferred.

The formation of allophanates or biurets of the urethane or urea groups by the monoisocyanates is preferably carried out using catalysts.

Carbodiimides

As a carbodiimide compound used in the present invention, those synthesized by commonly well known methods may be used. The compound can be obtained, for example, by conducting a decarboxylation condensation reaction of various polyisocyanates using an organophosphorus compound or an organometallic compound as a catalyst at a temperature not lower than about 70° C., without using any solvent or using an inert solvent.

Examples of a monocarbodiimide compound included in the above-described carbodiimide compounds are dicyclohexylcarbodiimide, diisopropylcarbodiimide, dimethylcarbodiimide, diisobutylcarbodiimide, dioctylcarbodiimide, tert.-butylisopropylcarbodiimide, 2,6-diisopropylphenylencarbodiimide, diphenylcarbodiimide, di-tert.-butylcarbodiimide and di-β-naphthylcarbodiimide, and among them, dicyclohexylcarbodiimide or diisopropylcarbodiimide is particularly preferable in view of easiness in an industrial availability.

Further, as a polycarbodiimide compound included in the above-described carbodiimide compounds, those produced by various methods may be used, but basically those produced by conventional production methods for polycarbodiimide [for example, the methods disclosed in U.S. Pat. No. 2,941,956; JP-B-47-33279, J. Org. Chem. 28, 2069-2075 (1963) and Chemical Review, 1981, Vol. 81, No. 4, pages 619 to 621] can be used.

An organic diisocyanate, as a raw material for producing a polycarbodiimide compound includes, for example, aromatic diisocyanate, aliphatic diisocyanate, alicyclic diisocyanate or a mixture thereof, and specifically includes 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenylene isocyanate and 1,3,5-triisopropylbenzene-2,4-diisocyanate.

In addition, in the case of the above-described polycarbodiimide compound, a degree of polymerization thereof can be controlled to an appropriate level by using a compound such as monoisocyanate capable to react with a terminal isocyanate group of the polycarbodiimide compound.

The monoisocyanate to control the degree of polymerization thereof by capping a terminal group of the polycarbodiimide compound includes phenyl isocyanate, tolyl isocyanate, dimethylphenyl isocyanate, cyclohexyl isocyanate, butyl isocyanate and naphthyl isocyanate.

Further, the terminal capping agent to control the degree of polymerization by capping a terminal group of the polycarbodiimide compound is not limited to the above-described monoisocyanates, and includes compounds having an active hydrogen capable to react with isocyanate, for example, (i) an aliphatic, aromatic or alicyclic compound having —OH group such as methanol, ethanol, phenol, cyclohexanol, N-methylethanolamine, oligo- and polyethylene glycol monoalkyl ether and oligo- and polypropylene glycol monomethyl ether, fatty and olelylalcohols; (ii) a compound having a =NH group such as diethylamine and dicyclohexylamine; (iii) a compound having a =$NH_2$ group such as butylamine and cyclohexylamine; (iv) a compound having a —COOH group such as succinic acid, benzoic acid and cyclohexanecarboxylic acid; (v) a compound having a —SH group such as ethylmercaptan, allylmercaptan and thiophenol; and (vi) a compound having an epoxy group.

The decarboxylation condensation reaction of the above-described organic diisocyanate is performed in the presence of a suitable carbodiimidation catalyst. As the carbodiimidation catalyst to be used, an organophosphorus compound and an organometallic compound [a compound expressed by general formula M-$(OR)_4$, wherein M is titanium (Ti), sodium (Na), potassium (K), vanadium (V), tungsten (W), hafnium (Hf), zirconium (Zr), lead (Pb), manganese (Mn), nickel (Ni), calcium (Ca) and barium (Ba) and the like; R is alkyl group or aryl group having carbon atoms of 1 to 20] are preferable, and phospholeneoxide among organophosphorus compounds and alkoxides of titanium, hafnium and zirconium among organometallic compounds are particularly preferable from the viewpoint of activity. Strong bases, such as alkali and earthalkali hydroxides, -oxides, alcololats and phenolates may also be used.

The above-described phospholeneoxides include specifically 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide, 1-methyl-2-phospholene-1-oxide and double bond isomers thereof. Among them, 3-methyl-1-phenyl-2-phospholene-1-oxide is particularly preferable due to easiness in an industrial availability.

The carbodiimide compound for the function includes in particular 4,4'-dicyclohexylmethanecarbodiimide (degree of polymerization=2 to 20), tetramethylxylylenecarbodiimide (degree of polymerization=2 to 20), N,N-dimethylphenylcarbodiimide (degree of polymerization=2 to 20) and N,N'-di-2,6-diisopropylphenylencarbodiimide (degree of polymerization=2 to 20) and the like, and is not specifically limited as long as the compound has at least one carbodiimide group in a molecule having the function.

Within the meaning of the present invention, suitable carbodiimides are in particular monomeric, dimeric or polymeric carbodiimides.

In the following, some aspects of the preferred carbodiimide compounds are described in detail.

In a first mode of the present invention, a monomeric carbodiimide is used within the present invention.

In this mode of the present invention the carbodiimide is preferably represented by the general formula (III)

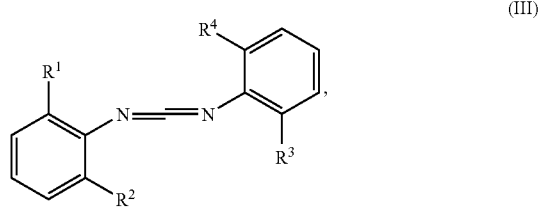

in which the residues $R^1$ and $R^4$ represent independently from each other a linear or branched $C_2$- to $C_{20}$-alkyl residue, a $C_2$- to $C_{20}$-cycloalkyl residue, a $C_6$- to $C_{15}$-aryl residue or a $C_6$- to $C_{15}$-aralkyl residue.

It is preferred that the residues $R^1$ to $R^4$ are $C_2$- to $C_{20}$-alkyl or $C_2$- to $C_{20}$-cycloalkyl residues.

It is further preferred that the residues $R^1$ to $R^4$ are $C_2$- to $C_{20}$-alkyl residues.

In the present invention, $C_2$- to $C_{20}$-alkyl and $C_2$- to $C_{20}$-cycloalkyl stands preferably for ethyl, propyl, isopropyl, sec.-butyl, tert.-butyl, cyclohexyl and/or dodecyl, whereby the residue isopropyl is in particular preferred.

In the present invention, $C_6$- to $C_{15}$-aryl and $C_6$- to $C_{15}$-aralkyl stands preferably for phenyl, tolyl, benzyl or naphthyl.

A respective carbodiimide which is usable within the present invention is commercial available from Rhein Chemie Rheinau GmbH under the trademark Additin® 8500, Stabaxol® 1, Stabaxol® 1 LF. Further carbodiimides which are usable within the present invention are commercial available from Rasching under the trademarks Stabilisator 3000, 7000 and 7000 A In a second mode of the present invention, a polymeric carbodiimide is used.

A respective polymeric carbodiimide has the general formula (IV)

$$R'\text{—}(N\text{=}C\text{=}N\text{—}R)_n\text{—}R'' \qquad (IV)$$

in which
R represents an aromatic, aliphatic, cycloaliphatic or aralkylene radical which, in the case of an aromatic or an aralkylene residue, in at least one ortho-position, preferably in both ortho-positions to the aromatic carbon atom which carries the carbodimide group, may carry aliphatic and/or cycloaliphatic substituents with at least 2 C-atoms, preferably branched or cyclic aliphatic radicals with at least 3 C-atoms, R' represents aryl, aralkyl or R—NCO, R—NHCONHR¹, R—NHCONR¹R² and R—NHCOOR³, R" represents —N=C=N-aryl, —N=C=N-alkyl, —N=C=N-cycloalkyl, —N=C=N-aralkyl, —NCO, —NHCONHR¹, —NHCONR¹R² or —NHCOOR³, wherein, in R' and in R", independently of one another, $R^1$ and $R^2$ are the same or different and represent an alkyl, cycloalkyl or aralkyl radical, and $R^3$ has one of the meanings of $R^1$ or represents a polyester or a polyamide radical, and n represents an integer from 2 to 5,000, preferably from 2 to 500.

In a first preferred embodiment of this mode, R represents an aromatic or an aralkylene radical, which, in the case of an aromatic or an aralkylene residue, in at least one ortho-position, preferably in both ortho-positions to the aromatic carbon atom which carries the carbodimide group, carries aliphatic and/or cycloaliphatic substituents with at least 2 C-atoms, preferably branched or cyclic aliphatic radicals with at least 3 C-atoms, more preferably isopropyl residues.

In particular those carbodiimides of the general formula (I) or (II) are preferred in which the ortho-positions to the aromatic carbon atom which carries the carbodimide group are substituted by isopropyl and in which the para-positions to the aromatic carbon atom which carries the carbodimide group are also substituted by isopropyl.

In a further preferred embodiment of these polymeric carbodiimides, R represents an aromatic residue, which is bonded by a $C_1$- to $C_8$-alkyl moiety, preferably a $C_1$- to $C_4$-alkyl moiety, with the carbodiimide group.

Furthermore, polymeric aliphatic carbodiimides can be used, for example on the basis of isophorone diamine or H12-MDI (hydrogenated MDI), which are commercially available by Nisshinbo.

To prepare the carbodiimides and/or polycarbodiimides of the general formula (I) resp. (II), it mono- or diisocyanates can be condensed as starting compounds at elevated temperatures, for example at 40 to 200° C., in the presence of catalysts with the release of carbon dioxide. Suitable methods are described in DE-A-11 30 594 and in FR 1 180 370. Strong bases or phosphorous compounds, for example, have proved satisfactory as catalysts. Phospholene oxides, phospholidines and phospholine oxides and the respective sulfides are preferably used. Furthermore, tertiary amines, basic reacting metal compounds, metal salts of carbonyl acids and non-basic organometallic compounds can also be used as catalyst.

Suitable for preparing the carbodiimides and polymeric carbodiimides are all isocyanates, wherein aromatic isocyanates substituted by $C_1$- to $C_4$-alkyl, such as 2,6-diisopropylphenyl isocyanate, 2,4,6-triisopropylphenyl 1,3-diisocyanate, 2,4,6-triethylphenyl 1,3-diisocyanate, 2,4,6-trimethylphenyl 1,3-diisocyanate, substituted diisocyanatodiphenyl-methanes, such as 2,4'-diisocyanato-diphenylmethane, 3,3',5,5'-tetraisopropyl-4,4'-diisocyanato-diphenylmethane, 3,3',5,5'-tetraethyl-4,4'-diisocyanato-diphenylmethane, and tetramethylxylol diisocyanate and their mixture; substituted aralkyls, such as 1,3-bis(1-methyl-1-isocyanatoethyl)benzene, are preferably used. In particular, it is preferred that the carbodiimides are based on 2,4,6-triisopropylphenyl 1,3-diisocyanate.

Polycarbodiimides may comprise, in the case they are prepared from isocyanates as starting materials, reactive NCO-groups and complex-bonded monomeric isocynates.

These NCO-groups containing polycarbodiimides may be modified in such a way that the present isocyanate groups are reacted with compounds comprising reactive hydrogen, such as alcohols, phenols or amines (cf. DE 11 56 401 A and DE 24 19 968 A). In this regard, reference is also in particular made to polypropylene glycole monoalkylether, fatty- and oleylalkohol residues.

The polymeric carbodiimides of the general formula (II) may be terminal reacted with isocyanate compounds.

Polymeric carbodiimides are commercially available from Rhein Chemie Rheinau GmbH under the names Stabaxol® P, Stabaxol® P100, Stabaxol® P200 and Stabaxol® P400. Furthermore, respective carbodiimides are commercially available from Rasching under the names Stabilisator 2000, 9000 and 11000.

The carbodiimides may also be used as a mixture of different carbodiimides.

In a further embodiment of the present invention, it is also possible that a mixture of different carbodiimides is used. In the case a mixture of different carbodiimides is used, the used carbodiimides may be selected from the group consisting of monomeric, dimeric and polymeric carbodiimides. In respect to the monogenetic, dimeric and polymeric carbodiimides, it is referred to the explanations above.

Furthermore, it is preferred that the used carbodiimides have a reduced content of free isocyanates. Preferred carbodiimides have a reduced content of free isocyanates lower than 1 wt. %.

MODE OF OPERATION OF THE ACTIVATORS TO BE USED ACCORDING TO THE INVENTION

According to the invention, it was found that, through using a cyclic isocyanate or allophanate within the meaning of the invention as an activator, the species that actually acts is not immediately available in the composition according to the invention with the catalyst, but is only released after a certain time when the ring structure in the cyclic isocyanate is opened or the allophanate is split, thus leading to a delay in the start of the polymerization. The reason for this is that the dioxodiacetine bond of the uretdion groups of the cyclic isocyanate and the bonds to be broken in the allophanate are only broken at higher temperatures, before the monomeric isocyanate is produced, which then acts as the active species.

Due to the delayed release of the activator, it is possible, in particular, to produce large cast polyamide molded articles in which an early start of polymerization would generally lead to an inhomogeneous molded article.

Furthermore, it was found according to the invention that an excellent crystallinity of the cast polyamide is achieved using the activator according to the invention.

Relative to the catalyst, the system according to the invention (kit of parts) or the composition according to the invention preferably comprises 5 to 500% by wt., particularly preferably 10 to 250% by wt., in particular 15 to 100% by wt., of activator.

If the system according to the invention or the composition according to the invention consisting of at least one catalyst and at least one activator according to the invention for producing cast polyamides is used, the composition according to the invention preferably comprises at least one lactam to be polymerized.

Lactams having at least 4 carbon atoms in the ring are suitable as lactams for producing cast polyamides. Preferred lactams are caprolactam, oenanthic lactam, caprylic lactam, lauryl lactam, lauric lactam as well as mixtures thereof. Caprolactam and lauric lactam are used particularly preferably within the context of the present invention, in particular □-caprolactam. Preferably, the composition according to the invention exclusively contains lactams as the polymerizable constituents, i.e., in particular monomers.

The catalyst used within the context of the present invention in the system according to the invention (kit of parts) or in the composition according to the invention for the anionic polymerization of lactams is known to the person skilled in the art per se. Such catalysts include, for example, alkali metals, such as sodium; alkali metal salts of lactams, for example caprolactamate, oenanthic lactamate, caprylic lactamate, lauryl lactamate, lauric lactamate and mixtures thereof; alkali metal hydrides, for example, sodium hydride; alkali metal alcoholates, for example sodium methanolate; lactam magnesium bromide and lactam magnesium iodide, such as caprolactam magnesium bromide and caprolactam magnesium iodide; alkali metal hydroxides, for example sodium hydroxide and potassium hydroxide; and organometallic compounds, for example Grignard compounds.

Alkali metal lactamates are preferred within the context of the present invention. According to the invention sodium caprylic lactamate, sodium caprolactamate, such as sodium-□-caprolactamate, and sodium lauryl lactamate are particularly preferably used.

Most preferably, mixtures of sodium caprolactamate and caprolactam, in particular, □ caprolactam, are used as catalyst.

Moreover, the composition according to the invention has at least one functional additive for polyamides. One possible additive is a silicic acid. Other functional additives are, for example, selected from the group consisting of:
1. Reinforcing fillers, for example glass fibers, carbon fibers and polymer fibers;
2. Non-reinforcing fillers, for example calcium sulfate, calcium carbonate, barium sulfate, silcates, such as wollastonite, kaolin, mica, hornblende, quartz, glass spheres and PTFE;
3. Flameproofing agents, for example phosphor compounds, such as organic phosphates, triyl phosphate, ammonium phosphate and halogenated organic compounds;
4. Forming agents, for example, silicone oils and high-melting waxes;
5. Lubricating agents, for example oils, such as paraffinic oils;
6. Antistatic agents, for example quaternary ammonium salts;
7. Agents for increasing the thermal and electrical conductivity, for example carbon black, metals, metal oxides and carbon nanotubes;
8. Colorants or pigments;
9. Stabilizers, for example UV stabilizers, such as benzophenone derivatives; antihydrolysis agents, such as carbodiimides, polycarbodiimides (e.g. Stabaxol by Rhein Chemie Rheinau); antioxidants, such as sterically hinderes amines and phenols;
10. Softening agents, for example adipates and phthalates;
11. Antiblocking agents, for example paraffin-polyethylene waxes and montanin waxes;
12. Thickening agents, for example vinyl aromate diene copolymers;
13. Impact-resistance modifiers, for example ABS copolymers, rubbers or polyolefins; and
14. Processing additives or auxiliary processing substances, for example reaction retarders and nucleation agents, such as molybdenum sulfide.

Preferred functional additives for polyamides are reinforcing fillers; flameproofing agents; agents for increasing the thermal and electrical conductivity, such as, in particular, carbon black; stabilizers, such as, in particular, antihydrolysis agents and UV stabilizers, as well as impact resistance modifiers.

In a preferred embodiment of the present invention, at least one reinforcing filler, particularly preferably reinforcing glass fibers, such as, for example, preferred ground spherical-glass fibers, is used as a functional additive.

In a preferred embodiment of the present invention, a polymerziable composition, i.e. a composition containing both a catalyst as well as an activator, contains a quantity of the reinforcing filler of at least approx. 15% by wt., particularly preferably at least approx. 30% by wt., still more preferably at least approx 40% by wt., even more preferably at least approx. 50% by wt., in each case relative to the total quantity of the polymerizable composition. A package of additives used for the preparation of a polymerizable composition, i.e. one that contains both a catalyst as well as an activator, may optionally contain a correspondingly larger quantity of the reinforcing filler. The use of reinforcing fillers is preferred, in particular, in conjunction with the use of silicic acid.

Another subject matter of the present invention is the use of cyclic isocyanates or allophanates within the meaning of the present invention as an activator in the preparation of cast polyamides by anionic polymerization and a process for preparing cast polyamides by anionic polymerization of lactams, wherein, as an activator, at least one is being used that is selected from the group consisting of cyclic isocyanates, allophanates, or mixtures thereof.

The use or the process usually takes place such that the activator and the catalyst are, in each case separately, metered into receivers of the lactam to be polymerized and that the resulting mixtures are homogenized, so that the catalyst and the activator are present, in each case separately, in the lactam to be polymerized in a dissolved state. The separate mixtures of the catalyst and the activator in the lactam are prepared at a temperature at which the lactam is sufficiently flowable, depending on the type of lactam to be polymerized, and the reaction preferably takes place at temperatures of 90 to 160° C., in particular 100 to 150° C., particularly preferably 120° C. to 140° C. With respect to the delay of the polymerization, it is preferred that the temperature is not to high, for example below 120° C.

The amount of activator according to the invention, relative to the lactam to be polymerized, generally is 0.01 to 10% by wt., in particular 0.1 to 5% by wt., especially 0.5 to 2.5% by wt. (after mixing all constituents including the catalyst, activator, lactam and, optionally, additives in a mold).

The amount of catalyst is known per se to the person skilled in the art, and the amounts known from the prior art may be used.

After the precursor mixtures have been prepared, the resulting mixtures are generally introduced into the mold for the cast polyamides preparation.

The addition of optionally used additives takes place at a suitable point in time prior to the start of the polymerization, into the precursor mixtures, for example.

In particular, the above described compositions according to the invention are applied within the context of this use. The use according to the invention of these compositions for preparing polyamides by anionic polymerization of lactams therefore comprises, in particular, the use of the above-described composition according to the invention, wherein the activator and the catalyst are usually first metered into separate lactam batches and homogenized with the lactam and are then brought together in the mold.

The composition to be used according to the invention is employed both in the preparation of prefabricated cast polyamide parts as well as of semi-finished cast polyamide products and composite materials. Both pressureless as well as pressure processes (such as the reaction injection technique) can be used. Other specific processes are standing casting, rotational casting and centrifugal casting. In addition, open or closed molds can be used. In the process, the usual mold temperatures, heating times and pouring times are applied.

Another subject matter of the present invention is a polyamide composition, which is optionally obtained in the form of a molded article, which composition is obtained by the anionic polymerization of at least one lactam in which the system according to the invention or the composition according to the invention consisting of catalyst and activator is used. According to the invention, it was found in the process that the resulting polyamide compositions have an excellent crystallinity.

The present invention will be explained in more detail with reference to the following examples, which, however, do not limit the present invention:

Example 1

Equipment and Reagents
  The apparatus for the melt processing consists of:
  2 three-necked flasks (500 ml) heated in an oil bath
  2 KPG stirrers with sleeve
  2 gas caps, one with, and one without tap
  1 vacuum pump with cold trap, manometer
  The apparatus for measuring temperature consists of:
  Temperature measuring device, e.g. Testo 175-T3 with an IR serial interface
  Thermo wire, to remain in the hardened sample
  Beaker 600 ml (tall shape)
  Heating system for the beaker (metal block, oil bath)
  Laboratory stopwatch (division: 1 second)
Reagents
  Caprolactam dry (EP>69° C.)
  Activator:
    dimeric TDI (according to the invention, commercially available as Addolink® TT from Rhein Chemie Rheinau GmbH, Mannheim)
    aliphatic polyisocyanate solution
  Nitrogen dry
  Catalyst NL-Neu (RheinChemie—mixture of caprolactam and sodium lactamate)
Execution and Measurement Flask A is charged with 196.8 g caprolactam and 3.2 g activator, flask B with 192 g caprolactam and 8 g catalyst NL-Neu.

The melts are treated at 122° C. (±2° C.) in an oil bath in a vacuum (<15 mbar) for 20 minutes.

After aerating with nitrogen, both components are united in a three-neck flask, stirred for a short period of time, and transferred into the 600 ml beaker.

The mold temperature (beaker) should be set to 160° C.

Time measurement is started immediately after uniting the melts in a three-neck flask.
Determination of Pot Life:

The temperature of the polymerizing lactam melt is measured every 10 seconds and recorded.

The duration of recording is 15 minutes. This ensures that slowly-hardening lactam melts are also included.

Generally, 10 minutes are sufficient.

The temperature curve of the polymerization mixture is taken over time, and the point in time at which the increase in temperature is maximal (inflection point of the temperature-time curve) is determined. The time from the combination of the reaction mixtures to the point in time of the maximum temperature increase is called pot life.

Table 1 shows the results.

| Example | Pot life | T. (max.) [° C.] |
|---|---|---|
| 1 (comparison) | 370 s | 197.0 |
| 2 (according to the invention) | 660 s | 193.6 |

As is apparent from the comparison of the examples, a delayed polymerization takes place when the system according to the invention is used.

The present invention has been described with reference to specific details of particular embodiments thereof. It is not intended that such details be regarded as limitations upon the scope of the invention except insofar as and to the extent that they are included in the accompanying claims. Furthermore, the examples below serve to illustrate the present invention without, however, restricting its subject-matter thereto. As used in this specification and the appended claims, the singular forms "a," "an," and "the" include plural referents unless the content clearly dictates otherwise.

What is claimed is:

1. A system, comprising:
   a) at least one catalyst capable of anionic polymerization of lactams selected from the group consisting of alkali metals, alkali metal salts of lactams, alkali metal hydrides, alkali metal alcoholates, alkali metal hydroxides and organo-metallic compounds; and
   b) at least one activator capable of anionic polymerization of lactams, wherein the at least one activator is a uretdione based on 1,4-cyclohexyl diisocyanate, hexamethylene-1,6-diisocyanate, isophorone diisocyanate, 1,4-cyclohexyl diisocyanate, 1,1-methylene-bis-(4-isocyanatocyclohexane), 1,2-bis-(9-isocyanatononyl)-3-heptyl-4-pentylcyclohexane, tetramethylxylylene diisocyanate, 4,4'-methylene diphenyldiisocyanate, 2,4-diisocyanatotoluene, 2,6-diisocyanatotoluene, 1,5-naphthylene diisocyanate,1,3-bis-(3-isocyanato-4-methylphenyl)-2,4-dioxodiazetidine, and/or N,N'-bis-(4-methyl-3-isocyanatophenyl)-urea.

2. The system according to claim 1, wherein the content of the at least one activator for the anionic polymerization of lactams, relative to the at least one catalyst for the anionic polymerization of lactams, is 5 to 500% by wt.

3. The system according to claim 1, further comprising at least one lactam.

4. The system according to claim 3, wherein the lactam comprises at least 4 carbon atoms in the ring.

5. The system according to claim 3, wherein the lactam is selected from the group consisting of caprolactam, oenathic lactam, caprylic lactam, lauryl lactam, lauric lactam and mixtures thereof.

6. The system according to claim 5, wherein the lactam is ϵ-caprolactam.

7. The system according to claim 1, further comprising at least one hydrophobic silicic acid.

8. The system according to claim 1, further comprising at least one additive selected from the group consisting of reinforcing fillers, non-reinforcing fillers, flameproofing agents, deforming agents, lubricants, antistatic agents, agents for increasing thermal conductivity, agents for increasing electrical conductivity, colorants, pigments, stabilizers, antihydrolysis agents, antioxidants, softeners, antiblocking agents, thickeners, impact resistance modifiers and auxiliary processing substances.

9. A kit comprising the system according to claim 1.

10. A process for the preparation of cast polyamides comprising providing the system according to claim 1 to a mould.

11. A process for preparing polyamides by anionic polymerization of lactams comprising providing the system according to claim 1.

12. A polyamide obtained by the process according to either claim 10 or 11.

* * * * *

UNITED STATES PATENT AND TRADEMARK OFFICE
CERTIFICATE OF CORRECTION

PATENT NO. : 8,354,492 B2
APPLICATION NO. : 12/372125
DATED : January 15, 2013
INVENTOR(S) : Bernd Kray et al.

It is certified that error appears in the above-identified patent and that said Letters Patent is hereby corrected as shown below:

In the Specification

Column 1, line 55, Column 9, line 58, and Column 10, line 15, replace "□ caprolactam" with -- ε caprolactam --

Column 10, line 12, replace "□ caprolactamate" with -- ε caprolactamate --

Signed and Sealed this
Twentieth Day of May, 2014

Michelle K. Lee
*Deputy Director of the United States Patent and Trademark Office*